United States Patent
Billman et al.

(10) Patent No.: US 9,953,383 B1
(45) Date of Patent: Apr. 24, 2018

(54) SYSTEMS AND METHODS FOR A HOME AREA RECOMMENDER

(71) Applicant: United Services Automobile Association (USAA), San Antonio, TX (US)

(72) Inventors: Bradly Jay Billman, Celina, TX (US); Charles Lee Oakes, III, Boerne, TX (US); Reynaldo Medina, III, San Antonio, TX (US); Michael Patrick Bueche, Jr., San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 15/459,135

(22) Filed: Mar. 15, 2017

Related U.S. Application Data

(63) Continuation of application No. 14/451,050, filed on Aug. 4, 2014, now Pat. No. 9,619,569, which is a
(Continued)

(51) Int. Cl.
*G06F 17/00* (2006.01)
*G06Q 50/16* (2012.01)
(Continued)

(52) U.S. Cl.
CPC ....... *G06Q 50/16* (2013.01); *G06F 17/30241* (2013.01); *G06Q 50/01* (2013.01); *H04L 67/306* (2013.01)

(58) Field of Classification Search
CPC .............. G06F 21/31; G06F 17/30864; G06F 17/30867
See application file for complete search history.

(56) References Cited

U.S. PATENT DOCUMENTS

| 6,385,541 | B1 | 5/2002 | Blumberg et al. |
| 7,071,842 | B1 | 7/2006 | Brady et al. |

(Continued)

OTHER PUBLICATIONS

Rob Cross, "Six Myths About Informal Networks . . . And How to Overcome Them" [Retrieved on Aug. 2, 2008], Retrieved from <URL:https://webapp.comm.virginia.edu> 16 pages.
(Continued)

*Primary Examiner* — Truong Vo
(74) *Attorney, Agent, or Firm* — Fish & Richardson P.C.

(57) ABSTRACT

Disclosed herein are a method, system, and computer-readable storage medium with instructions for recommending locations to a user. Preferred criteria may be selected by the user, for example, or a third party, and provide objective or subjective information that the user is seeking in a location. Embodiments may include compiling objective information with the location and comparing the objective information to preferred criteria. A user's profile may be compared to another person's profile, where the other person's profile is associated to the location. A location may be recommended to the user if the objective information correlates to the preferred criteria and if the other person's profile correlates to the user's profile. Subjective information associated with the location may be provided to the user along with the recommended location. Furthermore, a location may be recommended to the user if the subjective information correlates to the preferred criteria.

20 Claims, 6 Drawing Sheets

Related U.S. Application Data continuation of application No. 13/431,197, filed on Mar. 27, 2012, now Pat. No. 8,832,136, which is a continuation of application No. 12/059,474, filed on Mar. 31, 2008, now Pat. No. 8,145,661.

(51) Int. Cl.
*G06F 17/30* (2006.01)
*H04L 29/08* (2006.01)
*G06Q 50/00* (2012.01)

(56) References Cited

U.S. PATENT DOCUMENTS

| | | |
|---|---|---|
| 2004/0030631 A1 | 2/2004 | Brown et al. |
| 2004/0215793 A1 | 10/2004 | Ryan et al. |
| 2005/0273346 A1 | 12/2005 | Frost |
| 2006/0041663 A1 | 2/2006 | Brown et al. |
| 2006/0195442 A1 | 8/2006 | Cone et al. |
| 2007/0005419 A1 * | 1/2007 | Horvitz .................. G06Q 30/02 701/533 |
| 2007/0150297 A1 | 6/2007 | Olson et al. |
| 2007/0150537 A1 | 6/2007 | Graham et al. |
| 2007/0219712 A1 | 9/2007 | Abhyanker et al. |
| 2007/0233582 A1 | 10/2007 | Abhyanker et al. |
| 2007/0255581 A1 | 11/2007 | Otto et al. |
| 2008/0214157 A1 | 9/2008 | Ramer |
| 2008/0318594 A1 * | 12/2008 | Monnerat ............... G01S 19/06 455/456.1 |
| 2009/0111462 A1 | 4/2009 | Krinsky et al. |
| 2009/0192862 A1 | 7/2009 | Hoggard |
| 2012/0197705 A1 | 8/2012 | Mesaros |
| 2015/0324941 A1 | 11/2015 | Garg |

OTHER PUBLICATIONS

Steiniger, S. et al., "Foundations of Location Based Services," Project CartouCHe-Lecture notes on LBS, Feb. 9, 2008, http://;,vww-users.cs.umn.edu/shasbigroup/CS8715/Hv17 steinigeq2df, 28 pages.

* cited by examiner

SYSTEMS AND METHODS FOR A HOME AREA RECOMMENDER

CROSS-REFERENCES TO RELATED APPLICATIONS

This application is a continuation of U.S. patent application Ser. No. 14/451,050, filed Aug. 4, 2014, which is a continuation of U.S. patent application Ser. No. 13/431,197, filed Mar. 27, 2012, now U.S. Pat. No. 8,832,136, which is a continuation of U.S. patent application Ser. No. 12/059,474, filed Mar. 31, 2008, now U.S. Pat. No. 8,145,661, and is also related by subject matter to the embodiments disclosed in the following commonly assigned applications: U.S. patent application Ser. No. 12/059,351, filed Mar. 31, 2008; and U.S. patent application Ser. No. 12/059,563, filed Mar. 31, 2008, each entitled "SYSTEMS AND METHODS FOR A HOME AREA RECOMMENDER". The disclosure of each application is incorporated by reference herein in its entirety.

BACKGROUND

Typically, individuals interested in purchasing or renting real estate often desire to identify available properties that fall within the bounds of their selected search parameters (e.g., price range, square footage, number of bedrooms, etc.). The basic details about available properties are commonly available, such as through posted ads, a real estate agent, or a property listing service that maintains a database of available properties.

Based on preferred criteria, an automated search may be performed by a listing service or agent, and a search report may be returned to the user with available listings that satisfy the user's selected search parameters. For example, the service or agent may send an email update to an individual with information about select properties. The automatic search reports are convenient for a prospective buyer to be notified of properties that satisfy their search parameters. However, the information available to the user is limited, and the method of providing that information to the user is also limited.

The search parameters for searching properties are usually limited to basic property details, such as a price range, a preferred number of bedrooms and bathrooms, etc. Some listing services expand the search options to include other common features of a property that users may be seeking. A user may have the option to select properties that have, for example, a pool, or a finished basement, or a garage. Some services offer access to additional information that is publicly available for a property location, such as neighborhood demographics, etc. Yet even with this additional info, typically only basic details specific for a property are provided.

Many individuals consider other factors besides the basic details of an available property. Some individuals would like to know more broadly which neighborhoods or zip codes include features that appeal to the individual, regardless of whether any available properties are within a designated location. A real estate agent working for the buyer may provide more personalized information, such as details about the seller or information about the property that is shared between agents. However, the agent's knowledge is typically limited to the information shared between agents or the agent's personal knowledge of the area. And, some prospective buyers do not want the hassle of dealing with an agent or do not fully trust the agent because the agent presumably has the motivation to make a commission.

Thus, a tool is desired that would allow individuals to obtain and better access property information beyond the basic details provided by listing services, and to be able to share more reliable or trusted property-and neighborhood-related information. It would also be desirable for a prospective buyer or renter to be automatically provided with search results that are not limited to basic property information, but also include additional objective and subjective information about the location.

SUMMARY

In view of the above shortcomings and drawbacks, computer-readable storage media, methods, and computer systems for compiling basic property details and user-provided inputs to provide location recommendations to a user are provided.

A user's preferred search criteria, along with other data, may be compiled and compared to location-relevant information to make location recommendations. In an example embodiment, social networks provide access to location-relevant information. A social network system may provide a connection between people that facilitates interaction among its users. In another example embodiment, a service provider returns searches to a user based on member profiles and member inputs, locating individuals that are similarly situated. An aggregation of common real estate information combined with user-provided data may result in better searches for desired property.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Disclosed herein is an application for compiling location-relevant and user-related information and using the compiled information to provide location recommendations to a user. The subject matter of the disclosed embodiments is described with specificity to meet statutory requirements. However, the description itself is not intended to limit the scope of this patent. Rather, the claimed subject matter might also be embodied in other ways, to include elements similar to the ones described in this document in conjunction with other present or future technologies.

Figure 1:
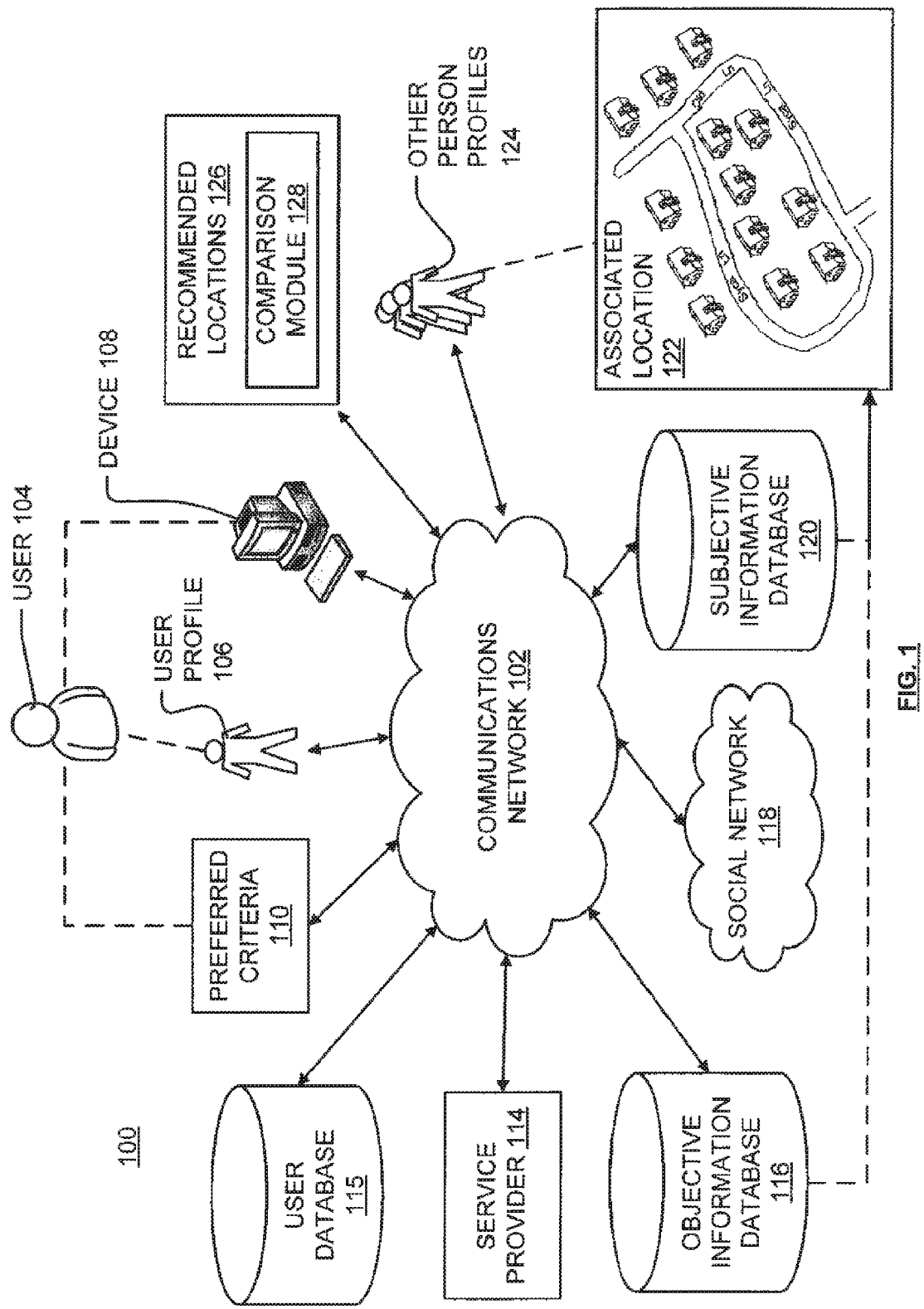
FIG. 1 depicts an example configuration of a system that compiles location-relevant information and recommends locations to a user.

FIG. 1 illustrates an example system 100 in which aspects of the techniques described herein may be employed. System 100 may include a user 104 and a user profile 106, preferred criteria 110, and a device 108 associated to the user 104. A user database 115 may be used to store both information about the user 104 and associated to the user 104. System 100 may include an objective information database 116, a subjective information database 120, and other person profiles 124 that are associated to an associated location 122. The associated location 122 may be defined narrowly, such as a single property location, or the location may be defined broadly and encompass, for example, a neighborhood, a region, an apartment complex, etc. Further, the system may include a social network 118, a service provider 114, and a comparison module 128. The components may communicate over a communications network 102 to share information, as shown in FIG. 1. Any of these components may have direct access to each other for sharing or storing information.

System 100 can be used to recommend locations 126 to the user 104. A user 104 may be, for example, a prospective buyer or renter of real estate, a realtor, or a business service. Preferred criteria 110 that is associated to the user 104 may be set, and a user profile 106 associated to the user 104 may be created. If the user is a realtor or a business service, the user profile 106 may be associated to a client. The user 104 could use a device 108, such as a home computer, to input preferred criteria 110 or create a user profile 106. The information could be shared over a communications network 102. The preferred criteria 110 and the user profile 106 may be generated by an entity other than the user 104, such as by a service provider 114. For example, if the user 104 creates a profile 106 from his home computer, the user profile 106 may be uploaded to a service provider 114, and the service provider 114 may generate preferred criteria 110 for the user 104 based on the user profile 106. If the user 104 is a realtor, the realtor could upload a user profile 106 on behalf of a client. A user database 115 may be compiled that includes an identity of the user 104 linked to items in the user profile 106, and/or preferred criteria 110 associated to the user 104.

Each of the databases 115, 116, and 120, either separately or combined, may be provided as a database management system, an object-oriented database management system, a relational database management system (e.g. DB2. Access, etc.), a file system or another conventional database package. Further, the databases can be accessed via a Structure Query Language (SQL) or other tools known to one of ordinary skill in the art.

A service provider 114 could be any entity that collects and stores information about a user 104. For example, the service provider 114 could be a service that collects, stores, maintains, and provides realty information, such as a listing service or agent agency. The service provider 114 may be any organization or business that provides a service to a consumer or business, or the like. Examples of such entities include membership organizations, such as employer/employee organizations, and providers of services, such as insurance companies, home-locator services, employers seeking to provide information to its employees, or the like.

The service provider 114 may generate profiles based on information provided by its customers, or collect the information from profiles created remotely. For example, if the service provider 114 is an insurance agency, the agency may collect and store information about its policy-holders. The service provider 114 may maintain the user profile 106 or have access to user profiles 106 over a communications network 102.

An objective information database 116 may compile objective information associated to an associated location 122. The objective information may include information from any source that can provide objective information about a location such as an associated location 122. For example, a service provider 114 such as a listing service could provide realty details to the objective information database 116 for storage. Often, realty listing services have access to the commonly known "multiple listing service" (MLS), which is a group of private realty databases used by real estate brokers representing sellers to share information about properties with other real estate brokers. Local and private databases may also be maintained by associations of realtors, such as real estate agencies, that each has a reciprocal access agreement with the MLS. Other public and private listing services maintain property information. For example, for-sale-by-owner listing services enable a seller acting as a for-sale-by-owner, who cannot put a listing directly on the MLS, to list his properties so that they are searchable by prospective buyers. Any of these services could provide objective information to the objective information database 116 that is associated with a location.

A listing service such as those described typically provides basic real estate information specific to realty that is for sale or rent. These details may be data about the property, such as the number of bedrooms, price range, or if there is a pool, for example. Where the associated location 122 is a single realty location, the objective information database 116 may also compile information specific to the property, such as realty sale history, zoning parameters, or an estimated home value, for example. The objective information database 116 may also be associated to an associated location 122 that is not a single realty. For example, the associated location 122 could be defined by a zip code. The objective information database 116 may compile information about the zip code, which may include basic real estate details about properties, for sale or not, within that zip code. The objective information database 116 may also include other objective details associated to the associated location 122, such as neighborhood demographics, grocery store locations, realty information, any available realty locations, neighborhood demographics, realty sale history, etc.

Many individuals consider other factors besides objective information, such as subjective information, to determine if a location appeals to them. Subjective information may be information belonging to a subject rather than to the object of thought, such as an individual's opinions about a location. For example, prospective buyers of real estate in an area may be interested in knowing a resident's opinion and assessment of location-relevant attributes, such as how busy they think traffic is in the area or if a neighbor has an incessantly barking dog. Prospective renters may want opinions from current or previous tenants, such as their opinion about whether an apartment building is "kid-friendly," or if their landlord has a tendency to delay fixing reported problems. A subjective information database 120 may compile the subjective information associated to the associated location 122.

In an example embodiment, system 100 may include a social network 118 for collecting information associated to an associated location 122, including subjective information that is compiled by the subjective information database 120. Social networking services are becoming more commonplace for building online social relationships for communities of people that share interests and activities. The social network 118 may be web-based and provide a variety of ways for users 104 and to interact, such as through chat programs, email, video, file sharing, discussion groups, etc. The social networks 118 may have additional features, such as the ability to create groups that share common interests or affiliations, upload videos, or hold discussions in forums. The user 104 may input a user profile 106 onto the social network 118. Other users may also create profiles on the social network 118, input comments onto the social network 118, or access information from the social network 118.

In general, social networking services break down into two broad categories: internal social networking (ISN) and external social networking (ESN) sites. An ISN is a closed/private community that consists of a group of people within a company, association, society, education provider and organization or even an "invite only" group created by a user 104 in an ESN. An ESN is open/public and available to all web users to communicate and are designed to attract advertisers.

Services such as social networking sites, and the like, typically contain directories of some categories, such as former classmates, connecting with friends, etc. Personal networks may be created between friends, family, colleagues, classmates, or people who are otherwise similarly situated. Individuals tend to be more likely to trust and value the opinions of people they know, and the network relationships provide a way for people to connect to more people. Individuals will also be more likely to trust people who are similarly situated, even if they do not know them personally. For example, employees of the same company who are located in different parts of the country or world may trust or value the opinion of a fellow employee who they have never met in person merely because they have similar circumstance.

Thus, the subjective information database 120 may compile information that is stored, input, or otherwise gathered through the social network 118, and this subjective information may be associated to an associated location 122. For example, a contributor to the social network 118 could include a comment about a certain location or provide information about a particular neighborhood by tagging the comment with the corresponding location. The information may be specific to an address or be broad information about an area. For example, a user 104 of the social network 118 could identify an address and include a note about a very noisy dog. Or, a user 104 could select an area by zip code or neighborhood name and provide an opinion about traffic or speculations as to why a road is closed to the public, for example.

The subjective information database 120 may compile information from a social network 118 or any other source that may provide subjective information. Any entity that gathers or stores subjective information may compile the subjective information or manage the subjective information database 120. For example, if the service provider 114 is an employer who regularly seeks suitable locations for relocating employees, the employer may gather subjective information associated to various locations from employees and store it in the subjective information database 120. Another example of a service provider 114 is a home locator service that obtains subjective information from clients on a regular basis and may provide that information for compilation in the subjective information database 120.

User profiles 106 and other person profiles 124 may include information from a variety of sources. For example, the profiles 106 and 124 could be created on the social network 118 or uploaded from a service provider 114 or stored by an employer. For example, an employer may have a database of employee 104 information that includes the user profile 106 or other person profile 124. The service provider 114 could be an organization, such as an insurance provider, that maintains customer information. A realtor may input a user profile 106 on behalf of a client.

The other person profiles 124 are associated with a location, such as associated location 122, so the information in the other person profile 124 may also be associated to the associated location 122. For example, another person profile 124 may include an individual's name, age, and profession, and be associated to the person's residential address. Thus, an individual may provide information about a location on a social network 118, for example, and the profile 124 could be associated to one associated location, such as associated location 122. However, the information that the individual places on the social network 118 could be associated with a different location, the different location being the location for which the individual is providing information. For example, the individual could select an address or a street and provide subjective information, despite where the user resides. As described above, the subjective information database 120 may compile and link both the information and the associated location 122.

Thus, a collaboration of the components in system 100 could result in the aggregation of location-relevant and people-relevant information. A comparison module 128 may then use this information to provide a recommended location 126 to the user. The entity that uses the comparison module 128 may automatically generate and provide the recommended location(s) 126 to a user. Thus, the user 104 does not have to search through a social network 118 to find out certain information. For example, the user 104 could receive daily email updates with the recommendations.

Figure 2:
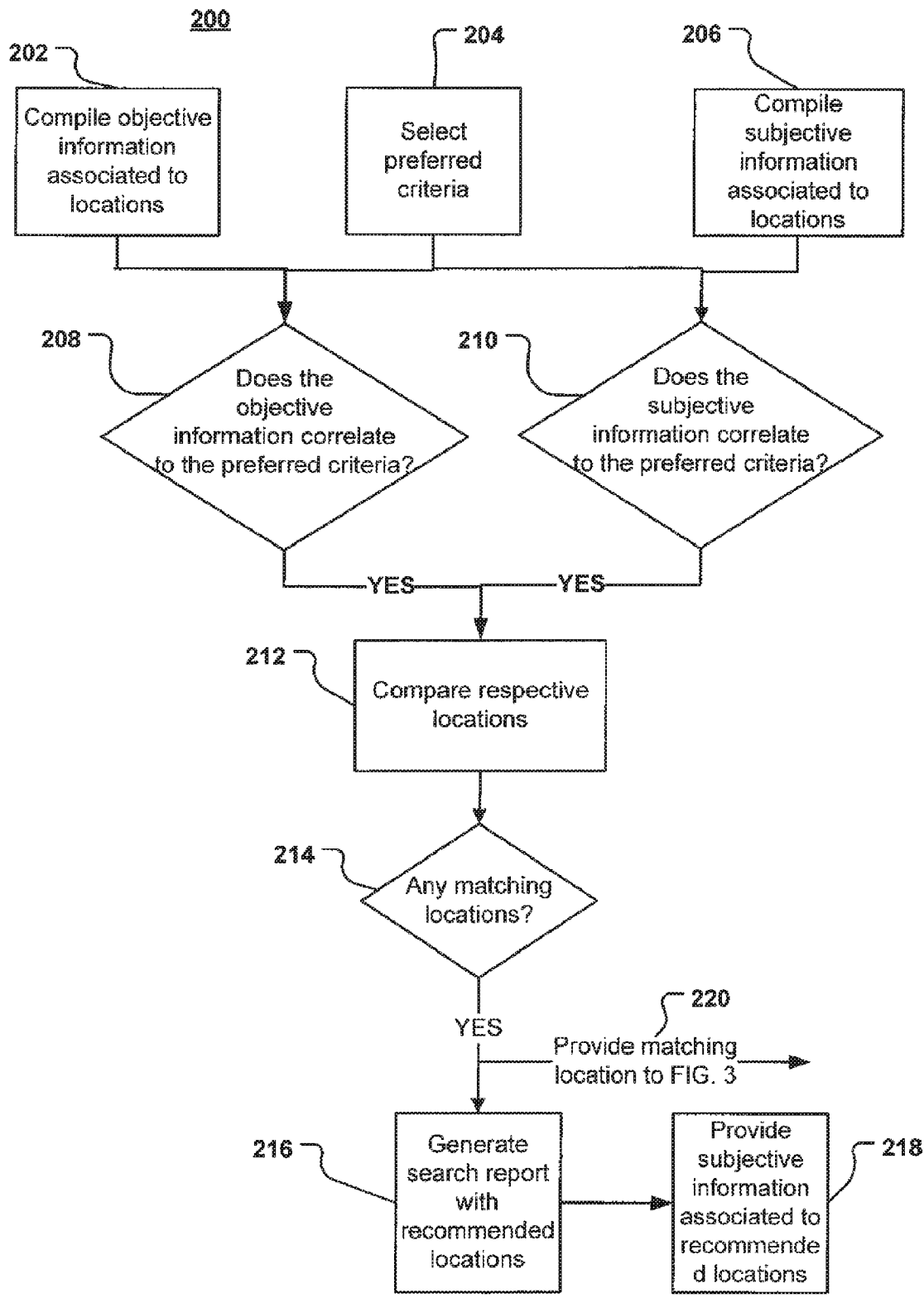
FIG. 2 depicts an example method of recommending a location to a user based on objective and subjective information.

FIG. 2 depicts an example method for recommending locations to a user 104 based on objective and subjective information associated to the locations. At 202, a database may compile objective information associated to various locations. The objective information may be specific, such as information about a particular property, or be broader, such as information about a zip code or a neighborhood. The objective information may include specific details about a property or properties within the location, an indication if any properties are for sale or rent, local attractions, information regarding sex offenders, zoning issues, etc. The objective information may include publicly available information, such as neighborhood demographics, area history, history of home sales in the location, etc.

An entity, such as a user or a third party, may select preferred criteria for the user 104 at 204. The preferred criteria 110 may provide baseline search parameters associated to the user 104. For example, the user 104 may be looking to purchase realty, and may set preferred criteria to include search parameters of a desired property. The search parameters could be objective information desired in a specific property, such as the number of bedrooms, price range, and square footage, for example. The preferred criteria 110 may also include information that can be measured subjectively.

The user's preferred criteria 110 may be set by the user 104 or by a third party. A third party may use items in a user's profile or other characteristics of the user to generate preferred criteria 110 associated with the user. Typically the third party has some information about the user. For example, a home locator service could obtain information about the user 104 and set preferred criteria 110 based on the user 104 and/or a user's profile 106. In another example, the user's financial advisor could set a price range in the preferred criteria 110 based on the user's financial outlook, for example.

At 206, a database may compile subjective information associated to various locations. For example, a member of a social network 118 could include a comment about a certain location in a blog on the social network, or provide information about a neighborhood in a chat room. The information may be specific to an address or be broad information about an area. For example, a user 104 of the social network 118 could identify an address and include a note about a very noisy dog. Or, a user 104 could select an area by zip code or neighborhood name and provide an opinion about traffic or recommend restaurants, for example. Social network users may select neighborhoods to chat about, or subscribe to areas based on where they live to participate in discussion groups, etc. The social network 118 may compile the subjective information from its users.

Further, any source with access to subjective information associated with a location may compile the information. For example, an employer may gather subjective information associated with a location from its employees. Another example is a home locator service that receives subjective information associated to various locations from their clients on a regular basis.

At 208 and 210, an entity such as a comparison module may compare the objective information and subjective information, respectively, to the preferred criteria set at 204. At 208, the determination is made whether any of the objective information correlates to the preferred criteria 110. At 210, the determination is made whether any of the subjective information correlates to the preferred criteria 110.

Information correlates to the preferred criteria if there is at least one matching item or similar concept. For example, objective information about a specific property location that has three bedrooms and three bathrooms correlates positively to preferred criteria that is set to three bedrooms and three bathrooms. In another example, the preferred criteria may be set for locations with low traffic. The subjective information could be based on user-inputs or opinions about traffic, and the objective information may be based on information provided by a local department of transportation, for example.

Both subjective and objective information may correlate to preferred criteria, such as preferred criteria set for a location with low traffic. The preferred criteria may have a high correlation to the subjective information, for example, if the compilation of subjective information highly suggests low traffic in the location. The correlation may be low, as well, such as if mixed opinions about traffic are provided. Providing the recommended locations to the user may include ranking the locations based on the level of correlation. Locations may also be eliminated as a potential recommended location 126 if there is a no correlation between the preferred criteria and either the subjective or objective information.

If both the objective information and the subjective information do correlate to the preferred criteria at 208 and 210, then an entity may compare the respective locations associated to the objective information and subjective information at 212. If any of those locations are a match at 214, then the entity may recommend the location to a user at 216. In another embodiment, the resulting matching locations at 214 may be provided at 218 for an input into another comparison, which will be described with respect to FIG. 3 below.

The compared locations may be a match if there is an exact property address. The locations may also be a match if they are in proximity to each other, such as within a certain range from each other or in the same zip code, for example. The location returned to the user 104 may be broader in this sense, such as being defined by the zip code. The preferences regarding the type of information received may be set by the user 104 in this regard.

At 216, the entity recommending the locations may automatically generate a report and provide the report that includes the recommended location(s) to the user 104. As described above, the user 104 may select subjective information in the preferred criteria 110, such that a location will not be recommended if the subjective information associated with the location does not correlate with his preferred criteria 110. Once a recommended location is determined, however, the user 104 may desire any or all of the available subjective information associated with the recommended location, at 218.

Thus, at 218, the user may receive subjective information that is associated with the recommended location without regard to whether the information correlated to the preferred criteria at 210. For example, the user 104 may wish to receive a report of recommended locations and additionally receive any available subjective information available for that location. The user 104 may also specify the type of subjective information to be included with the recommended locations at 218. For example, the user's preferred criteria 110 may include a request to receive only particular topics of subjective information about the recommended locations 126, such as opinions of other users regarding the traffic or safety.

Figure 3:
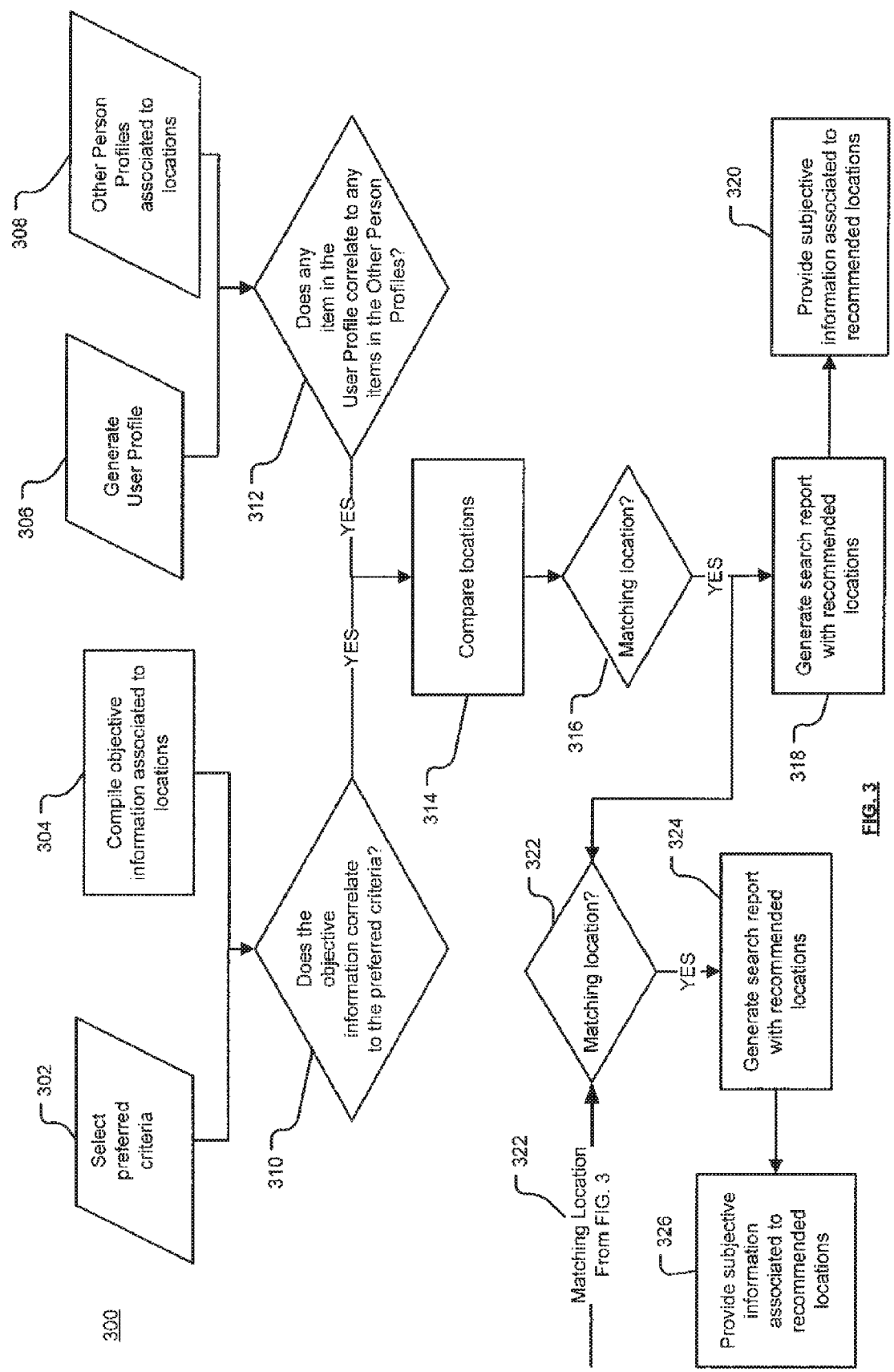
FIG. 3 depicts an example method of recommending a location to a user based on objective and user-relevant information.

FIG. 3 depicts an example method for recommending locations to a user 104 based on information in a user's profile 106 and objective information associated with a location. This method enables a user 104 to not only identify properties that are within their preferred criteria, but also locations that are in proximity to individuals with characteristics that are similar to the user.

The user profile generated at 302 may include information about the user, such as the user's age, profession, employer, or marital status, for example. Other person profiles 124 may include similar objective details about other individuals. The user or a third party may create the user profile 302. A service provider or organization may store the profiles. For example, a user's insurance company or bank may store details about the user 104 that could make up the user's profile. Online databases may maintain profile information pertaining to a member as well, such as social networking websites.

A database may compile objective information associated with locations at 304. A comparison module may compare the objective information to a user's preferred criteria at 310 to determine if any of the objective information correlates to the preferred criteria. At 312, a comparison module may compare the user's profile 106 to the other person's profile 124 to find other individuals who share characteristics with the user 104. An item in the user profile to be compared with items in other person profiles 124 may be specifically selected as a comparison item. Profiles correlate if they share at least one matching item or similar concept. Locations may also be eliminated as a potential recommended location 126 if there is a negative correlation between the user profile 106 and another person profile 124.

If the objective information correlates to the preferred criteria at 310, and an item in the user's profile 106 correlates to an item in another person's profile at 312, then the comparison module may compare the respective locations associated with the compiled objective information and the other person's profile. The compared locations may be a match if there is an exact property address. The locations may also be a match if they are in proximity to each other, such as within a certain range from each other or in the same zip code, for example. The location returned to the user 104 may be broader in this sense, such as being defined by the zip code. The preferences regarding the type of information received may be set by the user 104 in this regard.

If any of those locations are a match at 316, then the location is recommended to a user 104 at 318. An entity may automatically generate a report with the recommended locations and provide the report to the user 104 providing the recommended location. Furthermore, at 320, an entity may provide subjective information that is associated with the recommended location 126 to the user. The subjective information may be provided regardless of whether the information correlated to the preferred criteria 110. For example, the user 104 may wish to receive a report of recommended locations and additionally receive any available subjective information available for that location. The user 104 may also specify the type of subjective information to be included with the recommended locations at 218.

In another embodiment, the comparison module may compare the resulting matching locations at 316 to the matching location at 322. Thus, at 322, the comparison module may compare locations that are associated with objective information, locations associated with subjective information, and locations associated with other similarly situated individuals.

As described herein with respect to the comparisons of location-relevant information, the recommended locations may result from comparisons of any combination of the location-relevant information thereof. For example, a user 104 may desire to receive the locations that correlate objectively and subjectively to his preferred criteria, but not care if he is located near individuals with anything in common with him. Thus, the automatically generated report could include the recommended locations as described in FIG. 2 at 216. These recommended locations are the overlapping locations that are based on compiled objective information and compiled subjective information.

Similarly, the user 104 may select to receive the locations that overlap based on the sources of information, thus receiving the automatic search results as described in FIG. 3 at 324. Thus, the combination of overlapping search results can provide for a more focused search based on a user's preferred criteria. The overlapping locations recommended to the user 104 may be exact property matches, for example, or they could be regions, such as a zip code, that represents the overlapping locations.

Figure 4:
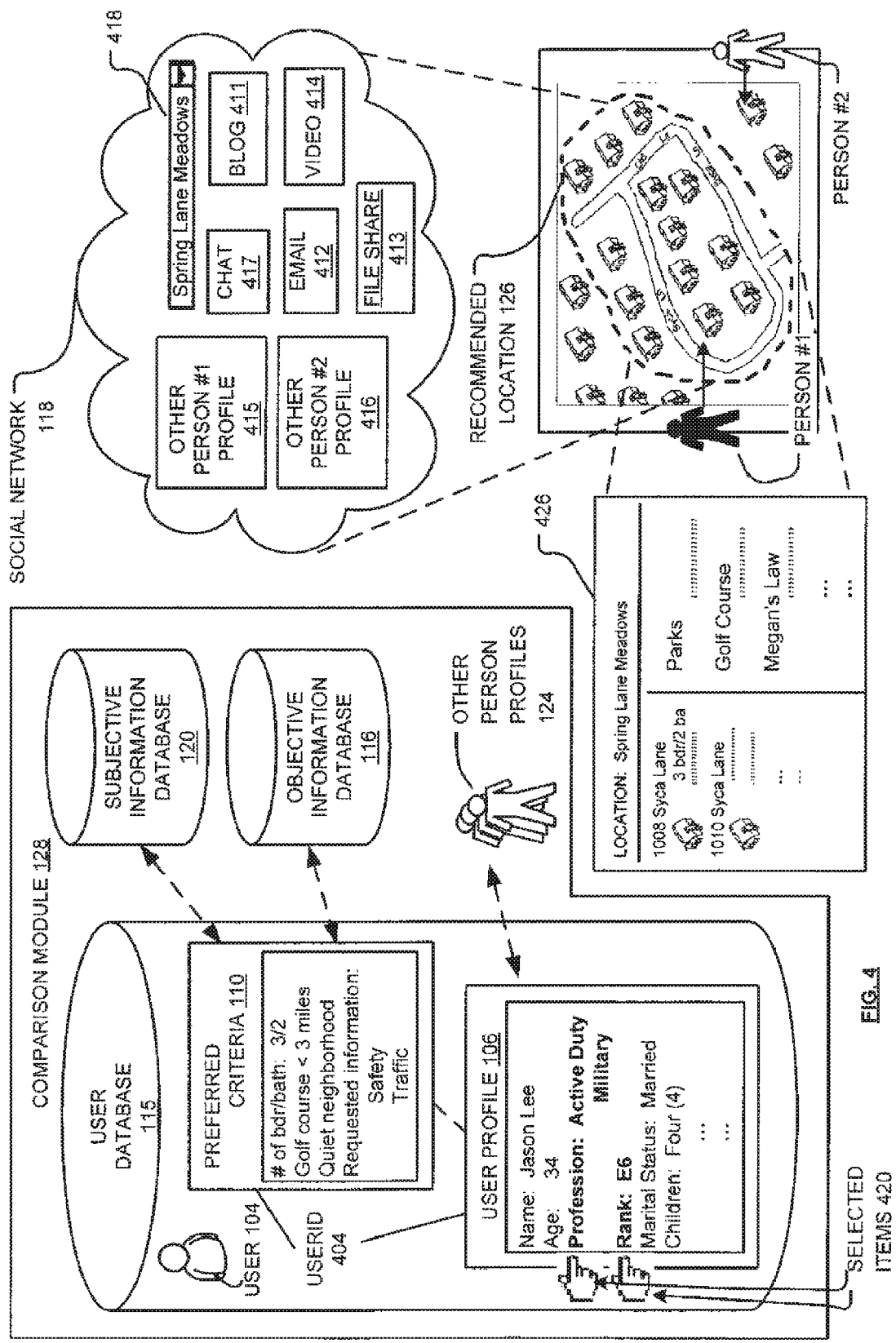
FIG. 4 depicts an example configuration of a comparison module and scenario for recommending locations to a user.

FIG. 4 depicts a graphical representation of the comparison module 128 and the inputs to the comparison module 128 with respect to an exemplary user 104. The comparison module 128 may compare information from the user database 115, an objective information database 116, a subjective information database 120, and other person profiles 124. As described herein, the objective information database 116 and the subjective information database 120 may compile information associated with a location from a variety of sources, and the other person profiles 124 may be generated in a variety of ways.

The user database 115 may include a USERID 404 that corresponds to a user profile 106 and preferred criteria 110 that is associated with a user. The user profile 106 may include information about the user. The information may be objective details, such as the user's age, profession, employer, or marital status, for example. The example user profile 106 depicted in FIG. 4 represents the profile of an active duty officer in the military, as indicated by his user profile 106. The user profile 106 includes the user's 104 name, Jason Lee, and age, 34, etc. as an example of the information include in a user profile. The user profile 106 may include any descriptive or objective details about the user 104.

The example preferred criteria 110 indicates, in part, that the user 104 is seeking property locations that have three bedrooms, two baths, and are within three miles of a golf course. The comparison module 128 may search the objective information database 116 and compare the preferred criteria 110 associated with the user 104 to the objective information compiled in the objective information database 116. If any information compared correlates, the locations associated with the objective information may be a first set of recommended results. In this example, an example recommended location is recommended location 126. The location summary 426 for the recommended location indicates the location as Spring Lane Meadows. Spring Lane Meadows is a neighborhood that has at least one property with three bedrooms and two baths within three miles of a golf course. The location summary 426 gives an example of what the compiled objective information for a recommended location 126 may include.

The user 104 may wish to live near other people who are similar to the user 104. The comparison module 128 may identify locations with objective information that correlates to the user's preferred criteria 110, but are also in proximity to other individuals that have similar characteristics to the user 104. For example, the comparison module 128 may compare other person profiles 124 to the user profile 106 by comparing an item in the user profile 106 to items in other person profiles 124. A particular item may be selected as a comparison item. If an item in the user profile 106, or a select comparison item chosen by the user, correlates to items in any of the other person profiles 124, the locations associated with the other person profiles 124 may be a second set of results. If any of the first set of results includes a location that is the same as a location in the second set of results, the location may be recommended to the user.

For example, assume the user 104 has to relocate and would like to live close to other active duty military personnel with a similar ranking. The user 104 selects those items from the profile as selected items 420 to search for in the other person profiles 124. In this example, the user 104 has therefore selected his profession and rank to be search criteria for in other person profiles 124. For example, person #1 may be an active duty military with an E-6 ranking associated with a property in the neighborhood Spring Lane Meadows. Thus, because Spring Lane Meadows is a location that correlates to the user's preferred criteria 110 and is the same as the neighborhood that person #1 lives in, the neighborhood is recommended to the user 104 in an automatically generated search report.

The preferred criteria 110 may also include information that could be measured subjectively. The comparison module 128 may produce a third set of results by comparing the preferred criteria 110 to the subjective information in the subjective information database 120. The user 104 could narrow the search by setting subjective information in the preferred criteria 110. For example, the user's preferred criteria 110 is set for quiet neighborhoods. If any subjective information associated with a location correlates to the user's preferred criterion, then those locations may either be a part of a third set of results if there is a positive correlation to the user's subjective criteria, or eliminated as a recommended location 126 if there is a negative correlation to the user's subjective criteria.

FIG. 4 illustrates the use of a social network 118 to gather subjective information about a location. With respect to location 102, Person #1 and Person #2 are exemplary users of a social network 118, each having another person profile, other person profile #1 and #2, on the social network 118. Person #1 is associated with the Spring Lane Meadows location because he lives on one of the streets. Person #2 is associated with the Spring Lane Meadows location because he provided information on the social network 118 with respect to Spring Lane Meadows, by choosing the location and providing data. If a user provides information for a location for which he does not reside, an indication may be included with the information provided. Social network users can contribute data through a blog 411, chat 417, email 412, video 414, file sharing 413, etc. The user on the social network could select a location, such as Spring Lane Meadows 418, from a pull-down menu, by doing a search, etc., and can input information about the location. If a search of the subjective information on the social network 118 that is associated with Spring Lane Meadows indicates that the location represents a quiet neighborhood, then the location may be recommended to the user.

The comparison module 128 may recommend locations based on locations in each set of results in any combination. For example, a user 104 may desire objective and subjective information that correlates to preferred criteria 110, but not care the location is near individuals with at least one common profile item. Thus, the recommended locations would be overlapping locations in the first and second sets of results. Similarly, the user 104 could request those locations that overlap all three sets. Thus, the combination of overlapping search results can provide for a more focused search based on a user's preferences. Overlapping locations may be exact property matches, for example, or they could be overlapping regions that surround each location.

Furthermore, a user may request to receive subjective information in the subjective information database 120 that is associated with the recommended location 126 in addition to the recommended locations (i.e., not input into the comparison module 128). For example, the user 104 may wish to receive subjective information as a compilation of any subjective information associated with the location. The comparison module 128 may recommend the neighborhood Spring Lane Meadows to a user 104 based on overlapping locations from any combination of the first, second, and third search sets. Included with the search results may be a compilation of any subjective information from the subjective information database 120 that is associated with Spring Lane Meadows.

The user 104 may select to receive subjective information from similarly situated individuals. For example, a location may be recommended to the user where another person's profile that correlates to the user's profile is associated with the location. The user may also receive subjective information from that same correlating other person's profile, or alternatively, receive subjective information associated with a different other person's profile that correlates to the user's profile.

The user 104 may limit the information received by selecting to receive the subjective information only from similarly situated individuals. Thus, the comparison module 128 may compare the other person profile 124 for the individual that contributed the subjective information. If the other person profile 124 correlates to the user profile 106, then the subjective information provided by that individual may be included for the user. For example, the user 104 may choose to receive subjective information from individuals with the selected item in their other person profile 124. The user 104 in this example can therefore limit the information received to be opinions about the recommended location 126 from other active duty military personnel that are similarly situated. Individuals may be more likely to trust and value the opinions of people they know or share similar features with, and the techniques described herein provide a way for people to obtain that information. The subjective information associated with another person's profile may be received.

Figure 5:
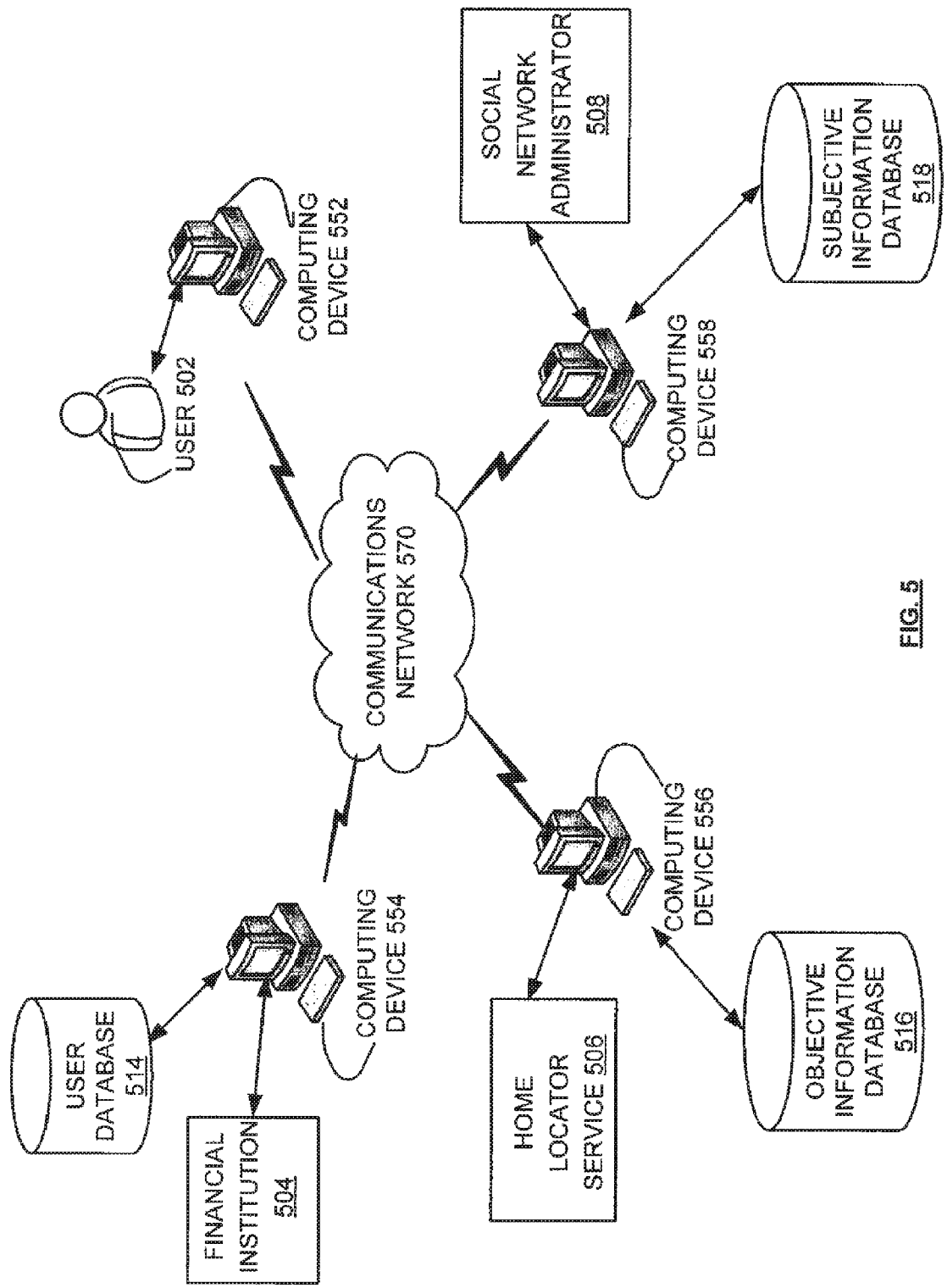
FIG. 5 depicts an example configuration of entities that are networked to perform the disclosed techniques.

FIG. 5 depicts several entities that are configured in an exemplary networked computing environment, each implementing computerized processes to perform the applications described above. One of ordinary skill in the art can appreciate that networks can connect any computer or other client or server device. In this regard, any computer system or environment having any number of processing, memory, or storage units, and any number of applications and processes occurring simultaneously is considered suitable for use in connection with the systems and methods provided.

FIG. 5 provides a schematic diagram of an exemplary networked computing environment with different entities networked to provide a user with recommended location 126s using the techniques disclosed herein. The exemplary entities that may collaborate to perform the techniques are a financial institution, a home locator service, and a social network administrator. The user may use computing device 552 to obtain the automatically generated results from the home locator service. The environment comprises computing devices 552, 554, 556, and 558 that are associated with each of entities, 502, 504, 506, and 508. Each computing device 554, 556, and 558 may be associated with a database, such as a user database 514, an objective information database 516, and a subjective information database 518, respectively.

In the example configuration described in FIG. 5, the user may request that a home locator service provide recommended locations. The home locator service may request and receive user information from the user's financial institution, such as their financial means, descriptive information about the user, etc. The home locator may select preferred criteria 110 based on the user data retrieved from the financial institution. The home locator service may run a search on locations that satisfy the preferred criteria 110 set for the user. Based on the resulting locations, the home locator service may request subjective information pertaining to those locations. The home locator service may eliminate locations from the search based on the subjective information. The home locator service may return the recommended location 126s to the user.

Each of these computing devices 552, 554, 556, and 558 may comprise or make use of programs, methods, data stores, programmable logic, etc. The computing devices 552, 554, 556, and 558 may span portions of the same or different devices such as PDAs, audio/video devices, MP3 players, personal computers, etc. Each entity 502, 504, 506, and 508 can communicate with another entity 502, 504, 506, and 508 by way of the communications network 570. In this regard, any entity may be responsible for the maintenance and updating of a database 514, 516, 518 or other storage element.

This network 570 may itself comprise other computing entities that provide services to the system of FIG. 5, and may itself represent multiple interconnected networks. In accordance with an aspect of the presently disclosed subject matter, each device 552, 554, 556, and 558 may contain discrete functional program modules that might make use of an API, or other object, software, firmware and/or hardware, to request services of or information from one or more of the other entities 552, 554, 556, and 558. For example, the home locator service 506 can request subjective information from the social network administrator over the communications network. The social network administrator may search the subjective information database and send a packet of data through the computing device 558 over the communications network 570. The computing device 556 associated with the home locator service may then receive the packet of information.

It can also be appreciated that any computing device, 552, 554, 556, or 558, may be another type of device or be hosted on another computing device 552. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support networked computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

Figure 6:
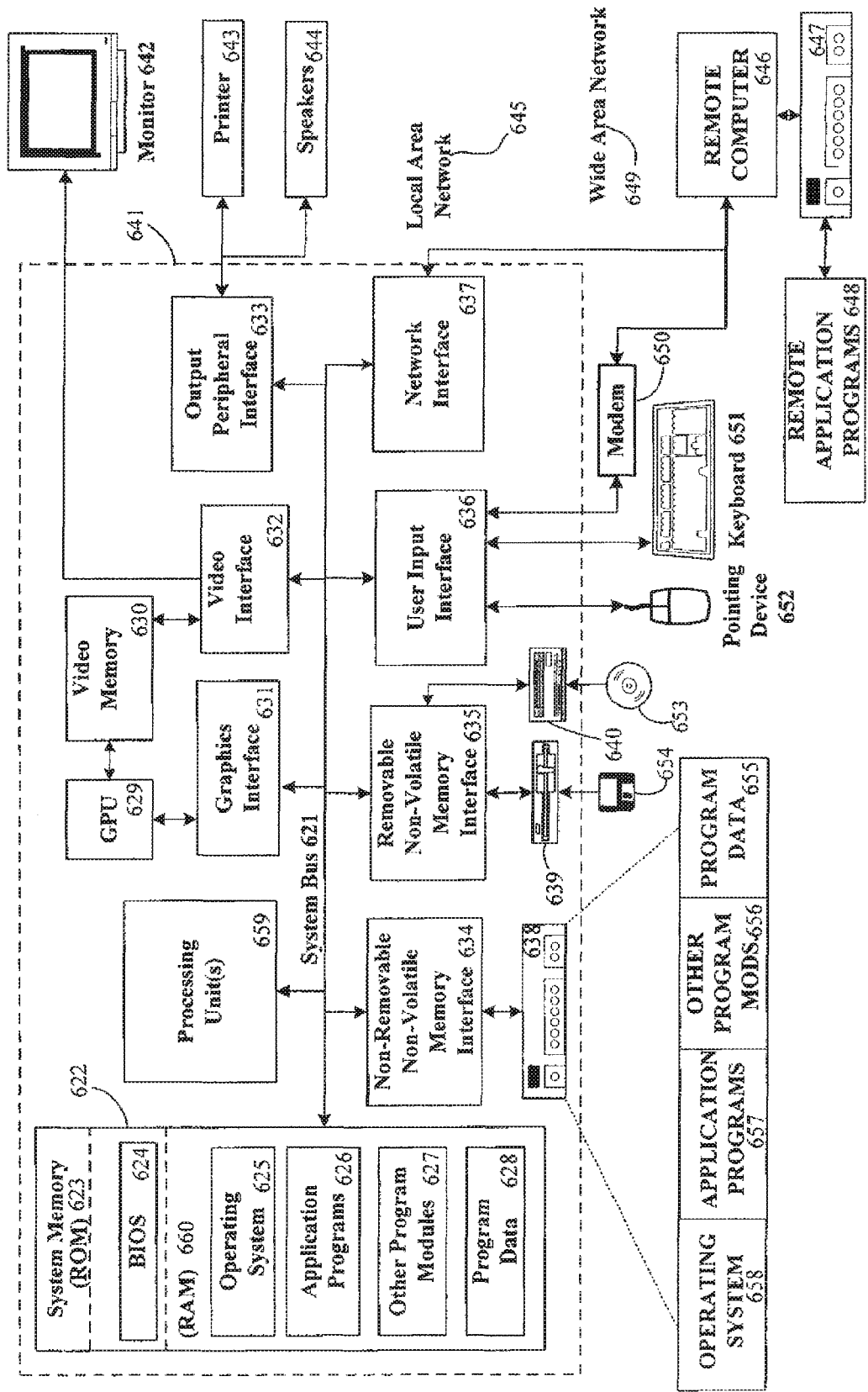
FIG. 6 depicts an example method of a computing system that can perform the disclosed techniques.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process uses the requested service without having to "know" any working details about the other program or the service itself. In a client/server architecture, particularly a networked system, a client is usually a computer that accesses shared network resources provided by another computer, e.g., a server. In the example of FIG. 6, any device 552, 554, 556, 558 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another using the functionality provided by protocol layer(s). For example, HyperText Transfer Protocol (HITP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

FIG. 6 depicts a block diagram representing an exemplary computing device suitable for use in conjunction with implementing the systems and methods described above. The computing device may be used by a user for receiving recommend locations. An entity that compiles information and compares the information against a user's preferred criteria 110 may similarly use a device such as that depicted in FIG. 6. For example, the computer executable instructions that carry out the processes and methods described herein may reside and/or be executed in such a computing environment as shown in FIG. 5. The computing system environment 620 is only one example of a suitable computing environment and is not intended to suggest any limitation as to the scope of use or functionality of the presently disclosed subject matter. Neither should the computing environment 620 be interpreted as having any dependency or requirement relating to any one or combination of components illustrated in the exemplary operating environment 620.

Aspects of the presently disclosed subject matter are operational with numerous other general purpose or special purpose computing system environments or configurations. Examples of well-known computing systems, environments, and/or configurations that may be suitable for use with the this subject matter include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the presently disclosed subject matter may be implemented in the general context of computer-executable instructions, such as program modules, being executed by a computer. Generally, program modules include routines, programs, objects, components, data structures, etc. that performs particular tasks or implement particular abstract data types. Aspects of the presently disclosed subject matter may also be practiced in distributed computing environments where tasks are performed by remote processing devices that are linked through a communications network. In a distributed computing environment, program modules may be located in both local and remote computer storage media including memory storage devices.

An exemplary system for implementing aspects of the presently disclosed subject matter includes a general purpose computing device in the form of a computer 641. Components of computer 641 may include, but are not limited to, a processing unit 659, a system memory 622, and a system bus 621 that couples various system components including the system memory to the processing unit 659. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 641 typically includes a variety of computer readable media. Computer readable media can be any available media that can be accessed by computer 641 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM. ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 641. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio-frequency (RF), infrared and other wireless media. Combinations of the any of the above should also be included within the scope of computer readable media.

The system memory 622 includes computer storage media in the form of volatile and/or nonvolatile memory such as read only memory (ROM) 623 and random access memory (RAM) 660. A basic input/output system 624 (BIOS), containing the basic routines that help to transfer information between elements within computer 641, such as during start-up, is typically stored in ROM 623. RAM 660 typically contains data and/or program modules that are immediately accessible to and/or presently being operated on by processing unit 659. By way of example, and not limitation, FIG. 6 illustrates operating system 625, application programs 626, other program modules 627, and program data 628.

The computer 641 may also include other removable/non-removable, volatile/nonvolatile computer storage media. By way of example only, FIG. 6 illustrates a hard disk drive 638 that reads from or writes to non-removable, nonvolatile magnetic media, a magnetic disk drive 639 that reads from or writes to a removable, nonvolatile magnetic disk 254, and an optical disk drive 640 that reads from or writes to a removable, nonvolatile optical disk 653 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 638 is typically connected to the system bus 621 through an non-removable memory interface such as interface 634, and magnetic disk drive 639 and optical disk drive 640 are typically connected to the system bus 621 by a removable memory interface, such as interface 635.

The drives and their associated computer storage media discussed above and illustrated in FIG. 6, provide storage of computer readable instructions, data structures, program modules and other data for the computer 641. In FIG. 6, for example, hard disk drive 638 is illustrated as storing operating system 658, application programs 657, other program modules 656, and program data 655. Note that these components can either be the same as or different from operating system 625, application programs 626, other program modules 627, and program data 628. Operating system 658, application programs 657, other program modules 656, and program data 655 are given different numbers here to illustrate that, at a minimum, they are different copies. A user may enter commands and information into the computer 641 through input devices such as a keyboard 651 and pointing device 652, commonly referred to as a mouse, trackball, or touch pad. Other input devices (not shown) may include a microphone, joystick, game pad, satellite dish, scanner, or the like. These and other input devices are often connected to the processing unit 659 through a user input interface 636 that is coupled to the system bus, but may be connected by other interface and bus structures, such as a parallel port, game port or a universal serial bus (USB). A monitor 642 or other type of display device is also connected to the system bus 621 via an interface, such as a video interface 632. In addition to the monitor, computers may also include other peripheral output devices such as speakers 644 and printer 643, which may be connected through an output peripheral interface 633.

The computer 641 may operate in a networked environment using logical connections to one or more remote computers, such as a remote computer 646. The remote computer 646 may be a personal computer, a server, a router, a network PC, a peer device or other common network node, and typically includes many or all of the elements described above relative to the computer 641, although only a memory storage device 647 as been illustrated in FIG. 6. The logical connections depicted in FIG. 6 include a local area network (LAN) 645 and a wide area network (WAN) 649, but may also include other networks. Such networking environments are commonplace in offices, enterprise-wide computer networks, intranets, and the Internet.

When used in a LAN networking environment, the computer 641 is connected to the LAN 645 through a network interface or adapter 637. When used in a WAN networking environment, the computer 641 typically includes a modem 650 or other means for establishing communications over the WAN 649, such as the Internet. The modem 650, which may be internal or external, may be connected to the system bus 621 via the user input interface 636, or other appropriate mechanism. In a networked environment, program modules depicted relative to the computer 641, or portions thereof, may be stored in the remote memory storage device. By way of example, and not limitation, FIG. 6 illustrates remote application programs 648 as residing on memory device 645. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs that may implement or use the processes described in connection with the presently disclosed subject matter, e.g., through the use of an API, reusable controls, or the like. Such programs are preferably implemented in a high-level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to using aspects of the presently disclosed subject matter in the context of one or more stand-alone computer systems, the said subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include personal computers, network servers, handheld devices, supercomputers, or computers integrated into other systems.

As is apparent from the above, all or portions of the various systems, methods, and aspects of the present embodiments may be embodied in hardware, software, or a combination of both. It is noted that the foregoing examples have been provided merely for the purpose of explanation and are in no way to be construed as limiting. While the embodiments have been described with reference to various embodiments, it is understood that the words which have been used herein are words of description and illustration, rather than words of limitation. Further, although the embodiments been described herein with reference to particular means, materials, the embodiments are not intended to be limited to the particulars disclosed herein; rather, the embodiment extends to all functionally equivalent structures, methods and uses, such as are within the scope of the appended claims.

What is claimed:

1. A computer-implemented method for recommending a property listing, the method being executed by one or more processors and comprising:
   receiving preferred criteria from a network device;
   compiling information associated with the property listing; and
   transmitting the property listing to a user device based on a determination that objective information in the compiled information associated with the property listing correlates to the preferred criteria and that subjective information in the compiled information associated with the property listing correlates to the preferred criteria.

2. The computer-implemented method of claim 1, wherein the network device is the user device.

3. The computer-implemented method of claim 1, wherein the preferred criteria are generated based on a user profile.

4. The computer-implemented method of claim 3, wherein transmitting the property listing to the user device is further based on a determination that at least one item of the user profile correlates to the at least one item in other user profiles, and wherein the other user profiles are associated with other locations in proximity to the property listing.

5. The computer-implemented method of claim 4, further comprising receiving a selection for the at least one item from the network device.

6. The computer-implemented method of claim 3, wherein a portion of the compiled subjective information is provided by a social network.

7. The computer-implemented method of claim 1, wherein the property listing is a single property location.

8. The computer-implemented method of claim 1, wherein the property listing is located in a neighborhood.

9. The computer-implemented method of claim 1, wherein the property listing is transmitted to the user device within a list of property listings, and wherein the property listing is ranked within the list of property listings relative to other property listings in the list of property listings based on a level of correlation between the preferred criteria and the compiled objective information associated with the property listing.

10. The computer-implemented method of claim 1, wherein the property listing is transmitted to the user device within a list of property listings, and wherein the property listing is ranked within the list of property listings relative to other property listings in the list of property listings based on a level of correlation between the preferred criteria and the compiled subjective information associated with the property listing.

11. One or more non-transitory computer-readable storage media coupled to one or more processors and having instructions stored thereon which, when executed by the one or more processors, cause the one or more processors to perform operations for recommending a property listing the operations comprising:
    receiving preferred criteria from a network device;
    compiling information associated with the property listing; and
    transmitting the property listing to a user device based on a determination that objective information in the compiled information associated with the property listing correlates to the preferred criteria and that subjective information in the compiled information associated with the property listing correlates to the preferred criteria.

12. The one or more non-transitory computer-readable storage media of claim 11, wherein the preferred criteria are generated based on a user profile.

13. The one or more non-transitory computer-readable storage media of claim 12, wherein transmitting the property listing to the user device is further based on a determination that at least one item of the user profile correlates to the at least one item in other user profiles, and wherein the other user profiles are associated with other locations in proximity to the property listing.

14. The one or more non-transitory computer-readable storage media of claim 13, wherein the operations further comprise receiving a selection for the at least one item from the network device.

15. The one or more non-transitory computer-readable storage media of claim 11, wherein the property listing is transmitted to the user device within a list of property listings, and wherein the property listing is ranked within the list of property listings relative to other property listings in the list of property listings based on a level of correlation between the preferred criteria and the compiled objective information associated with the property listing.

16. A system, comprising:
    one or more processors; and
    a computer-readable storage device coupled to the one or more processors and having instructions stored thereon which, when executed by the one or more processors, cause the one or more processors to perform operations for recommending a property listing the operations comprising:

receiving preferred criteria from a network device;

compiling information associated with the property listing; and transmitting the property listing to a user device based on a determination that compiled objective information in the compiled information associated with the property listing correlates to the preferred criteria and that compiled subjective information in the compiled information associated with the property listing correlates to the preferred criteria.

17. The system of claim 16, wherein the preferred criteria generated based on a user profile.

18. The system of claim 17, wherein transmitting the property listing to the user device is further based on a determination that at least one item of the user profile correlates to the at least one item in other user profiles, and wherein the other user profiles are associated with other locations in proximity to the property listing.

19. The system of claim 18, wherein the operations further comprise receiving a selection for the at least one item from the network device.

20. The system of claim 16, wherein the property listing is transmitted to the user device within a list of property listings, and wherein the property listing is ranked within the list of property listings relative to other property listings in the list of property listings based on a level of correlation between the preferred criteria and the compiled subjective information associated with the property listing.

* * * * *

UNITED STATES PATENT AND TRADEMARK OFFICE
CERTIFICATE OF CORRECTION

PATENT NO. : 9,953,383 B1  
APPLICATION NO. : 15/459135  
DATED : April 24, 2018  
INVENTOR(S) : Bradly Jay Billman et al.

Page 1 of 1

It is certified that error appears in the above-identified patent and that said Letters Patent is hereby corrected as shown below:

In the Claims

Column 19, Line 2, Claim 16, delete "listing" and insert -- listing, --, therefore.

Signed and Sealed this  
Ninth Day of October, 2018

Andrei Iancu  
*Director of the United States Patent and Trademark Office*